US007862375B2

(12) United States Patent
Oosterling

(10) Patent No.: US 7,862,375 B2
(45) Date of Patent: Jan. 4, 2011

(54) ELECTRICAL CONNECTOR FOR A ROLL-UP HEATING

(75) Inventor: Robert Oosterling, Zevenaar (NL)

(73) Assignee: Devi A/S, Vejle (DK)

( * ) Notice: Subject to any disclaimer, the term of this patent is extended or adjusted under 35 U.S.C. 154(b) by 0 days.

(21) Appl. No.: 12/553,254

(22) Filed: Sep. 3, 2009

(65) Prior Publication Data

US 2009/0325400 A1 Dec. 31, 2009

Related U.S. Application Data

(62) Division of application No. 11/663,073, filed as application No. PCT/NL2005/000677 on Sep. 16, 2005, now abandoned.

(60) Provisional application No. 60/616,409, filed on Oct. 7, 2004.

(30) Foreign Application Priority Data

Sep. 16, 2004 (NL) .................................. 1027053

(51) Int. Cl.
*H01R 33/00* (2006.01)
(52) U.S. Cl. ......................... 439/606; 439/37; 439/590; 439/597; 219/528
(58) Field of Classification Search ................. 439/606, 439/37, 590, 586, 597, 600; 219/527–529, 219/212, 549
See application file for complete search history.

(56) References Cited

U.S. PATENT DOCUMENTS

| 2,396,725 | A | 3/1946 | Thomas, Jr. .................. 439/590 |
| 3,283,284 | A | 11/1966 | Eisler |
| 3,325,769 | A | 6/1967 | Travis ........................ 439/496 |
| 3,510,547 | A | 5/1970 | Eisler |
| 3,539,767 | A | 11/1970 | Eisler |
| 3,544,762 | A | 12/1970 | Eisler |
| 3,721,800 | A | 3/1973 | Eisler |
| 4,115,917 | A | 9/1978 | Charon et al. |
| 4,141,187 | A | 2/1979 | Graves |
| 4,201,436 | A | 5/1980 | Genovese et al. ............. 439/48 |
| 4,715,119 | A | 12/1987 | Joosten ........................ 29/858 |
| 4,826,443 | A | 5/1989 | Lockard ..................... 439/101 |
| 4,927,366 | A | 5/1990 | Tommerson et al. .......... 439/37 |
| 5,334,039 | A | 8/1994 | Kanda ........................ 439/271 |
| 5,370,540 | A | 12/1994 | Kobayashi ................... 439/78 |
| 5,380,222 | A | 1/1995 | Kobayashi ................. 439/590 |
| 5,932,124 | A | 8/1999 | Miller et al. |

(Continued)

FOREIGN PATENT DOCUMENTS

GB 2 061 079 5/1981

*Primary Examiner*—Gary F. Paumen

(57) ABSTRACT

The roll-up heating (1) for a floor, or wall, comprises an insulating layer (10), a heating element (11) and a cladding (12). The insulating layer (10) is intended for laying on a floor (2) and the heating element (11) extends between the cladding (12) and the insulating layer (10). The cladding (12) is intended to support a floor covering and comprises a force distribution layer (13) for transmitting a force which is exerted on the cladding (12) in a distributed manner to the insulating layer (10). In as far as (a part of) the heating element (11) is at the location or in the vicinity of the exerted force, the load which will be exerted on it will be lower than the original load, due to the force being transmitted in a distributed manner. This lowers the risk of the heating element (11) being damaged.

14 Claims, 5 Drawing Sheets

U.S. PATENT DOCUMENTS

| | | |
|---|---|---|
| 5,942,140 A | 8/1999 | Miller et al. |
| 6,015,965 A | 1/2000 | Miller et al. |
| 6,087,630 A | 7/2000 | Miller et al. |
| 6,124,571 A | 9/2000 | Miller et al. |
| 6,817,867 B1 | 11/2004 | Carr et al. ..................... 439/37 |
| 6,890,213 B2 | 5/2005 | Ohtsuki ...................... 439/607 |
| 7,037,133 B2 | 5/2006 | Matsuo ...................... 439/606 |
| 2002/0153368 A1 | 10/2002 | Gardner et al. |
| 2003/0199947 A1 | 10/2003 | Gardner et al. |
| 2004/0229479 A1 | 11/2004 | Carr et al. ..................... 439/37 |
| 2006/0252284 A1 | 11/2006 | Marmaropoulos et al. .... 439/37 |
| 2009/0111286 A1* | 4/2009 | Giovannoni .................. 439/37 |

* cited by examiner

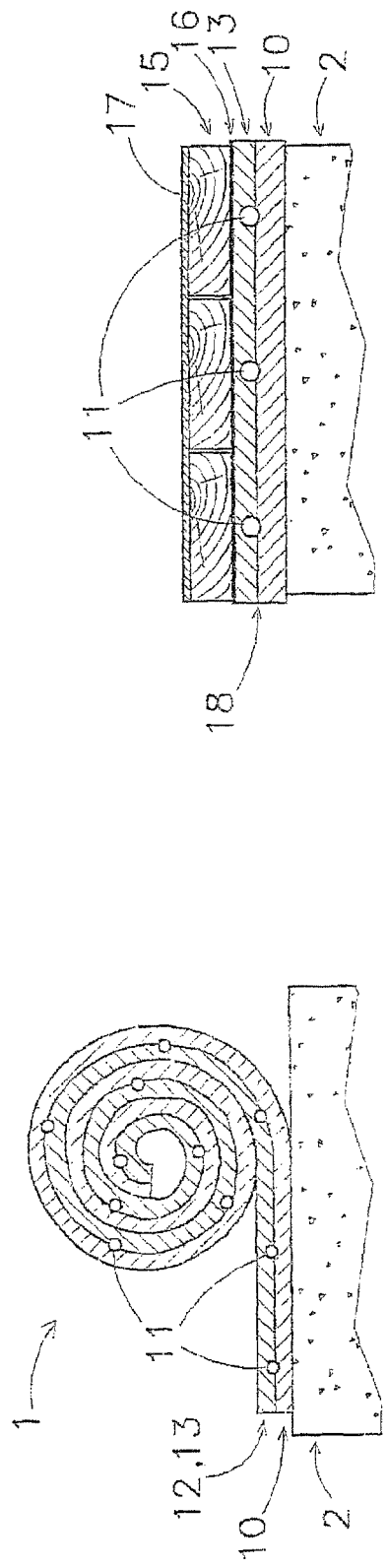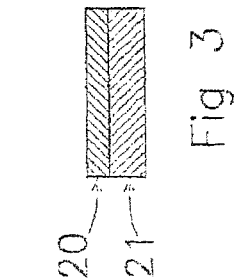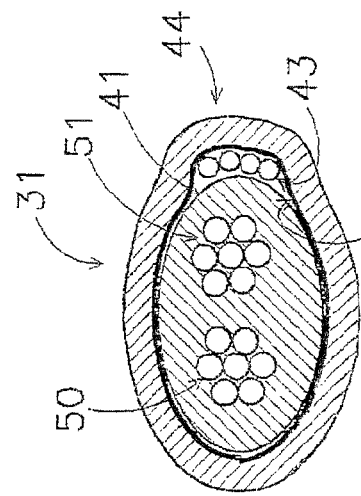

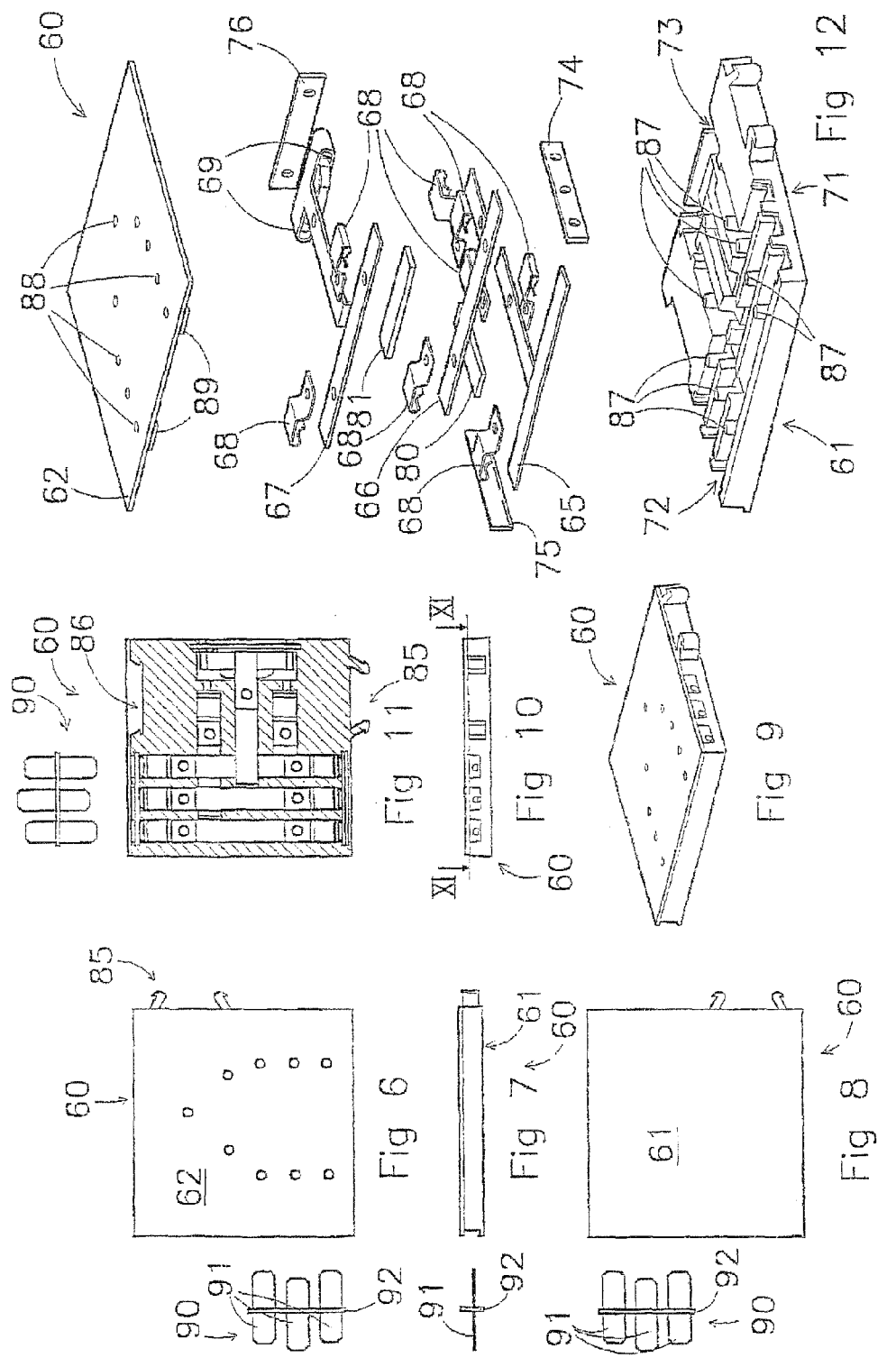

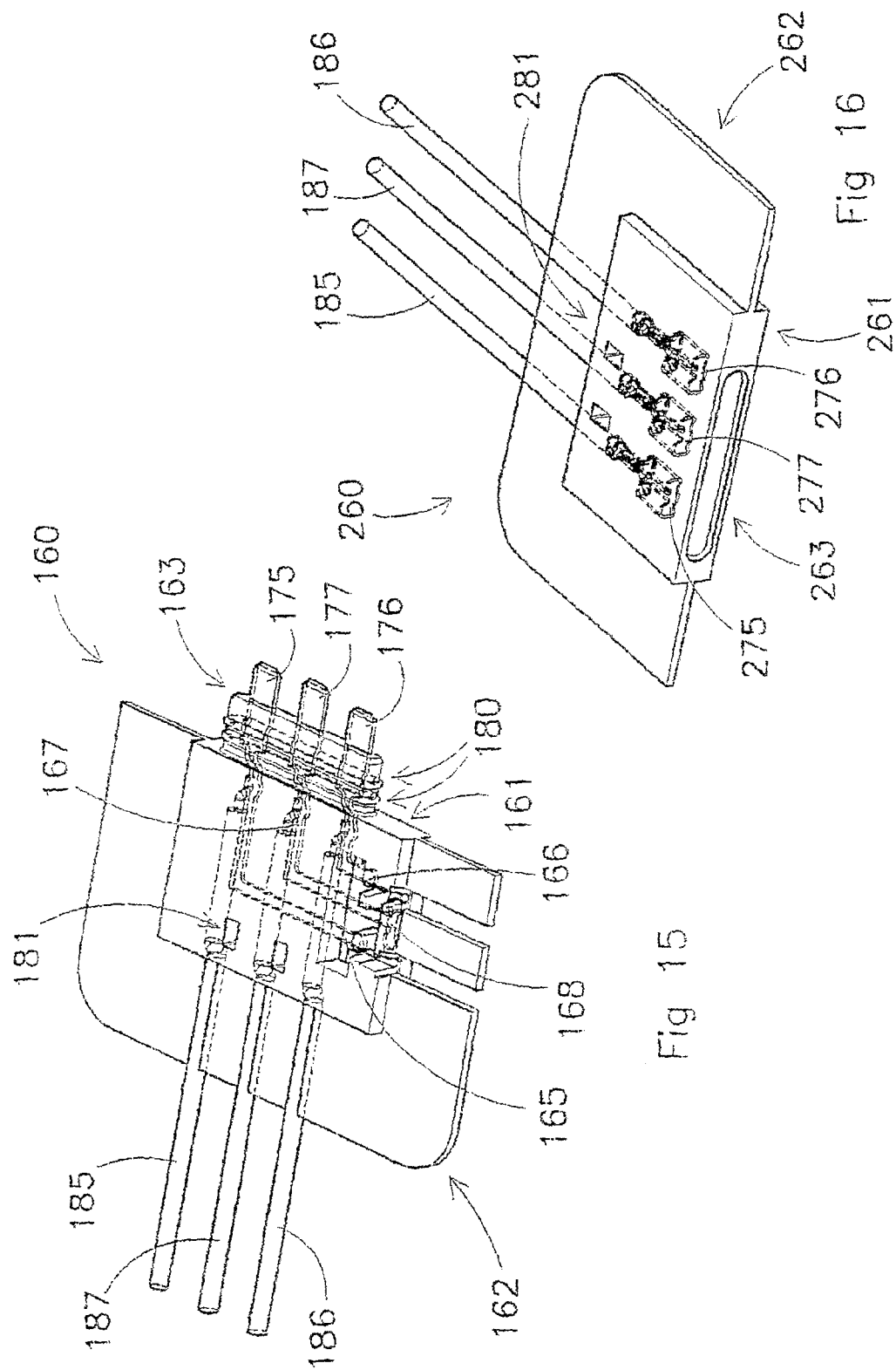

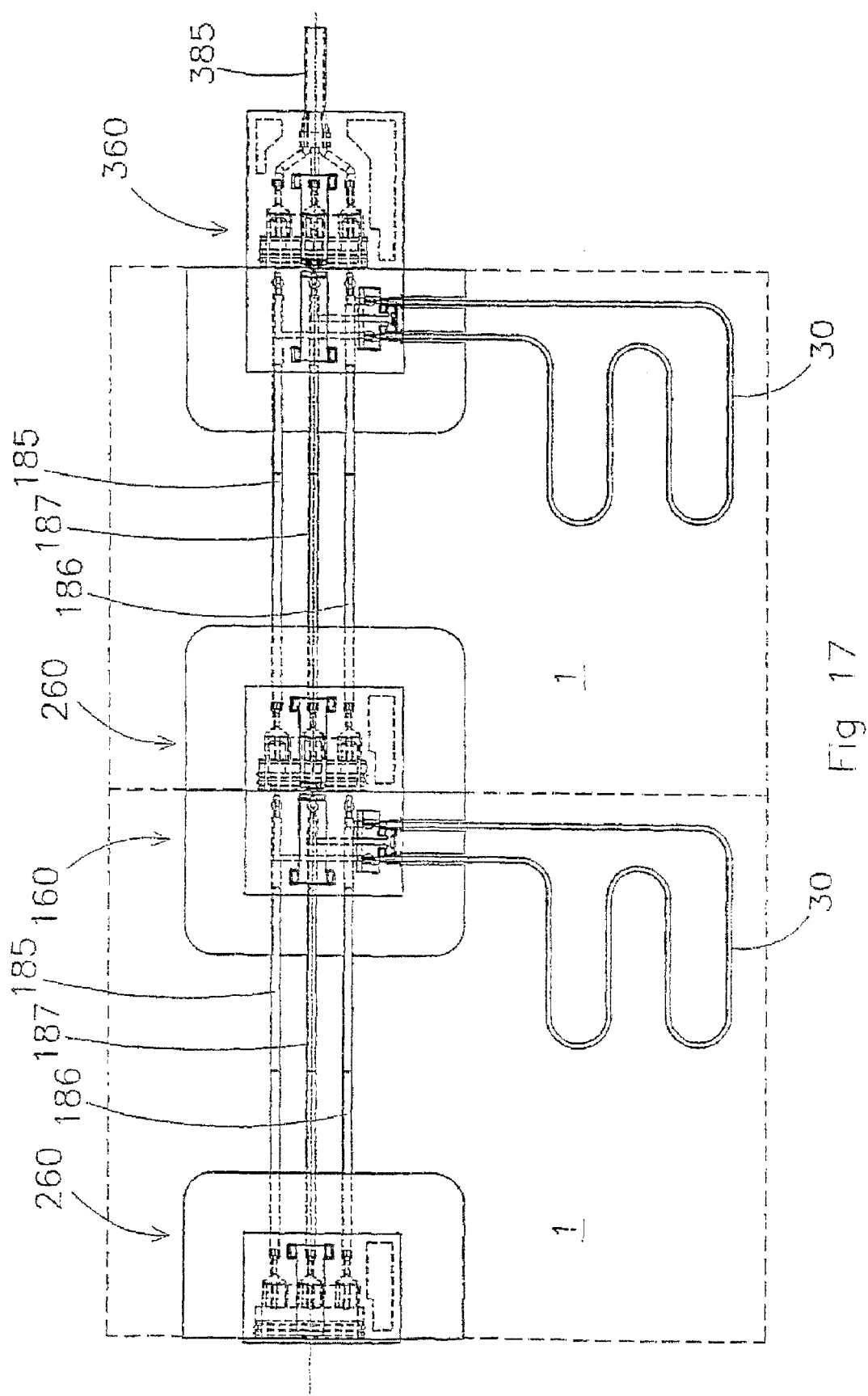

ELECTRICAL CONNECTOR FOR A ROLL-UP HEATING

This is a division of U.S. application Ser. No. 11/663,073, the disclosure of which is incorporated herein by reference.

The invention relates to a roll-up heating for a floor, or wall.

U.S. Pat. No. 3,539,767, in FIG. 11, discloses a roll-up floor heating which is composed of a number of layers. A metal foil through which electricity can be conducted serves as the heating element. This metal foil is glued between an underlay and a thin paper covering layer by means of polyvinyl chloride glue. A floor heating of this type can be rolled up during or after manufacture and transported to the room where it can serve as floor heating once it has been unrolled.

The known roll-up floor heating has the drawback that it is not readily suitable to be used directly under all types of floor coverings, since forces which are exerted on a floor covering and transmitted via this floor covering to the floor heating may lead to damage to the heating element.

It is an object of the invention to at least partially eliminate the abovementioned drawback or to at least provide a usable alternative.

In particular, it is an object of the invention to provide a heating for a floor, or wall onto which several types of floor covering can be laid and in which the risk of a load on the respective floor covering leading to damage to the heating element is small.

According to the invention, this object is achieved by a combination of a roll-up heating for a floor, or wall, and a connector, as will be described herein.

A roll-up heating for a floor, or wall comprises an insulating layer, a heating element and a cladding. The insulating layer is intended for laying on a floor and the heating element extends between the cladding and the insulating layer. The heating element is an elongated heating element, and the side of the insulating layer which is facing the cladding and/or the side of the cladding which is facing the insulating layer comprises a groove, which groove accommodates the elongated heating element.

When a force is exerted on the cladding, this force will be transferred via the insulating layer to the floor or wall. As the elongated heating element is in a groove, the force will bypass the elongated heating element, and will not, or at least to a lesser extent than in the prior art, be transferred through the heating element.

The object of the invention is further achieved with a roll-up heating for a floor, or wall, according to claim 11.

A roll-up heating for a floor, or wall comprises an insulating layer, a heating element and a cladding. The insulating layer is intended for laying on a floor and the heating element extends between the cladding and the insulating layer. The cladding is intended to support a floor covering. The roll-up heating for a floor, or wall further comprises a force distribution layer for transmitting a force which is exerted on the cladding in a distributed manner to the floor, or wall.

In as far as (a part of) the heating element is at the location or in the vicinity of the exerted force, the load which will be exerted on it will be lower than the original load, due to the force being transmitted in a distributed manner. This lowers the risk of the heating element being damaged.

The invention further relates to an electrical connector, adapted for being accommodated in a roll-up heating for a floor, or wall, being flexible such, that it is suitable for being rolled up with the a roll-up heating for a floor, or wall.

The invention also relates to a method for producing a roll-up heating for a floor, or wall, comprising a step of providing an insulating layer, an elongated heating element and a cladding, a step of laying the elongated heating element between the insulating layer and the cladding, and a step of joining the insulating layer and the cladding, wherein the elongated heating element is laid into a groove of the insulating layer and/or of the cladding.

Preferred embodiments of the invention are defined in the subclaims.

In particular, the cladding comprises at least part of the force distribution layer. This result in a solution with less different materials.

In one embodiment, the force distribution layer has a lower modulus of elasticity on its side facing the insulating layer than on its other side, in particular at most 67% of the modulus of elasticity of the other side.

In particular, the force distribution layer comprises a first and second sublayer. The second sublayer faces the insulating layer. The first sublayer has a higher modulus of elasticity than the second sublayer.

As a result of the difference in the modulus of elasticity, a point load on the force distribution layer results in a tensile stress which is higher on the side remote from the insulating layer, in particular the first sublayer. This tensile stress is substantially in the plane of the force distribution layer and causes a relatively large surface area of the top side of the force distribution layer to sink down. This whole area is supported by the part of the force distribution layer with the lower modulus of elasticity. In this manner, a point load of this kind is absorbed over a larger surface area, than with a force distribution layer with a comparable, but homogeneous modulus of elasticity. This results in a lower downward pressure in the part with lower modulus of elasticity.

Expediently, the thickness of the force distribution layer is at least 2 mm. This enables the heating element to be at least partially incorporated into the force distribution layer without this leading to an annoying bulge on the top side of the cladding, which could lead to problems when laying certain types of floors. In addition, such a minimum thickness makes it possible to transmit a force in a distributed manner.

In an embodiment, the insulating layer comprises a plastic foam. Such a plastic foam offers good insulating properties and is also able to at least partially accommodate the heating element.

In a particular form, a heat-diffusing layer is provided between the cladding and the insulating layer. Such a heat-diffusing layer makes it possible to use heating elements at discrete distances, the heat-diffusing layer ensuring that the heat generated by these elements is diffused between the cladding and the insulating layer and can thus be given off to the environment in a more uniform manner.

Advantageously, the heating element comprises an elongated heating element, such as an electrical resistance cable. Such an elongated heating element is per se less vulnerable than a resistance sheet, for example, but is at risk from being compressed too strongly when it is used in a roll-up heating for a floor, or wall. Due to the force distribution layer, and/or the groove, this risk of compression is relatively small.

In particular, the elongated heating element follows a meandering path with an intermediate distance between the loops of substantially at most 6 cm. By arranging the loops forming the meandering path a relatively small distance apart, the heat is distributed evenly.

In an embodiment, the thickness of the force distribution layer is equal to at least half the diameter, in particular at least the entire diameter, more in particular at least twice the diameter, of the elongated heating element. This enables the elongated heating element to be at least partially accommodated in the force distribution layer. In addition, such a minimum thickness enhances the distribution of a force.

Advantageously, the force distribution layer is compressible in such a manner that the electrical resistance cable is at least partially accommodated therein. This results in a load on the force distribution layer being transmitted to a lesser degree via the resistance cable than would be the case if the force distribution cable were less compressible.

In an advantageous embodiment, the electrical resistance cable comprises a first resistance wire, an electrically insulating sleeve extending around the first resistance wire and a conductive sheath extending around the insulating sleeve. The conductive sheath comprises an electrically conductive foil, in particular aluminium foil. A sheath made from a foil of this type is less expensive to produce than an conductive sheath made from braided copper wire.

In particular, the electrically conductive foil runs substantially parallel to the insulating sleeve and is folded around it. This also makes it possible to produce the conductive sheath in a simple manner.

In a variant, the electrically conductive foil is helically wound around the insulating sleeve in strip form. This makes it possible to produce the conductive sheath in a simple manner.

In a particular form, the conductive sheath furthermore comprises at least one earth wire which extends substantially parallel to the resistance cable. Such an earth wire contacts the electrically conductive foil and makes it possible to connect the conductive sheath at one end of the resistance wire to an external earthing means.

Embodiments of the invention will be explained in more detail with reference to the attached drawing, in which:

FIG. 1 shows a roll-up floor heating according to the invention in a partially rolled up and partially unrolled state;

FIG. 2 shows a part of the unrolled roll-up floor heating with a wooden floor covering;

FIG. 3 shows a detail of a force distribution layer;

FIG. 4 shows a detailed view of an electrical resistance cable in section;

FIG. 5 shows a variant of the roll-up resistance cable;

FIG. 6 shows a top view of a socket;

FIG. 7 shows a side view of the socket from FIG. 6;

FIG. 8 shows a bottom view of the socket from FIG. 6;

FIG. 9 shows a perspective view of the socket from FIG. 6;

FIG. 10 shows a second side view of the socket from FIG. 6;

FIG. 11 shows a section on line XI-XI in FIG. 10;

FIG. 12 shows an exploded perspective view of the socket from FIG. 6*l*;

FIG. 15 shows a perspective view of a male connector;

FIG. 16 shows a perspective view of a female connector;

FIG. 17 shows a perspective view of two roll-up floor heatings, with the connectors of FIGS. 15 and 16.

Figure 14:
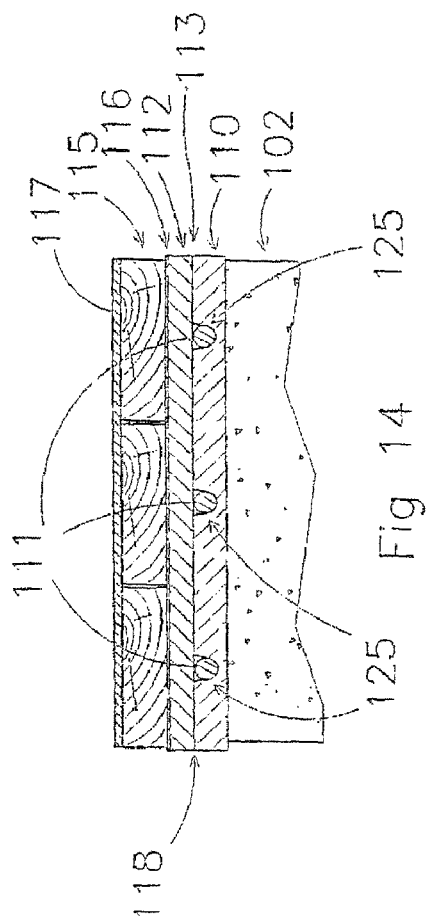
FIG. 14 shows a part of the unrolled roll-up floor heating of FIG. 13 with a wooden floor covering.

FIG. 1 diagrammatically shows a roll-up, or roll-out floor heating according to the invention which is denoted overall by reference numeral 1. The roll-out floor heating 1 is still partially rolled up in FIG. 1 and partially unrolled onto a floor, in this case a concrete floor 2. The roll-up floor heating 1 comprises an insulating layer 10, a heating element 11 and a cladding 12. In this exemplary embodiment, the cladding 12 in its entirety also acts as a force distribution layer 13. A floor covering is provided on the cladding 12, in this case consisting of a wooden or parquet floor 15. The wooden floor 15 is fixedly connected to the cladding 12 by means of an adhesive layer 16. A finishing layer 17 is provided on the wooden floor 15, for example a lacquer coating. An aluminium foil 18 extends between the insulating layer 10 and the force distribution layer 13. There is no rigid intermediate layer, above the cladding 12. The wooden floor 15 is supported directly by the cladding 12, while the force distribution layer 13 protects the heating element 11 against loads on the wooden floor 15.

The force distribution layer 13 comprises a first and a second sublayer. The first sublayer 20 has a higher modulus of elasticity and a higher density than the second sublayer 21. The second sublayer 21 exhibits a greater compressibility than the first sublayer 20.

The force distribution layer 13 comprises a nonwoven material or felt. This material comprises non-woven fibres which are bonded to one another by a thermal or mechanical join. Both natural and synthetic fibres are eligible for use with this invention. Preferably, latex is used in the force distribution layer 13 as well. Rubber, either natural or synthetic, is preferably present in the first sublayer 20. In particular, the concentration rubber is higher at the outside of the first sublayer 20, i.e. at the upper side in use, of the force distribution layer 13, than at the side of the first sublayer 20 that is facing the second sublayer 21.

The first sublayer 20 is a nonwoven membrane having a higher material density and modulus of elasticity than the second sublayer 21. The first sublayer 20 is connected to the second sublayer 21, for example by means of a needled perforation or by being passed between two rollers. As the first sublayer 20 has a higher density, it can not only absorb tensile stresses very well, but also forms a more or less continuous surface, which is advantageous when applying adhesive for gluing a floor covering. The force distribution layer 13 is elastic to such a degree that it can absorb the shrinkage and expansion of the wooden floor covering 15 glued onto the cladding 12.

The thickness of the force distribution layer 13 is substantially 6 mm, but preferably at least 2 mm, in particular at least 3 mm, more in particular at least 4 mm, and even more in particular at least 5 mm. The thickness of the first sublayer 20 is substantially at most equal to half the total thickness of the force distribution layer 13.

A force distribution layer 13 of such thickness, and compressibility, and in particular that of the second sublayer 21, partially accommodates the heating element 11 in such a manner that the cladding 12 is flatter at the top than is the case in the prior art. As a result, the roll-up floor heating 1 is better suited to different types of floors. The insulation layer 10 may also be compressible, so that the heating element 11 is also partially accommodated in the insulating layer 10.

When a point load is exerted on the force distribution layer 13, this mainly results in a compression of the second sublayer 21 and the insulating layer 10. As a result of its higher modulus of elasticity, a tensile stress will occur in the first sublayer 20, substantially in the plane of the force distribution layer 13. This causes the first sublayer 20 to sink over a larger surface area than if its modulus of elasticity were lower, thus distributing the point load over a larger surface area.

The insulating layer 10 is made from a plastic foam, with a thermal conduction coefficient of substantially 0.2 W/(m·K). In addition, the insulating layer has good sound-absorbing properties. In particular, the insulating layer results in a noise reduction of at least 10 dB. The insulating layer 10 also has an equalizing function, as a result of which minor unevenness in the floor 2 is absorbed by the insulating layer 10. In addition, the insulating layer 10 is slightly resilient, thus making it more comfortable. The thickness of the insulating layer 10 is preferably at least 2 mm, in particular at least 3 mm, more in particular at least 4 mm, more in particular at least 5 mm and still more in particular at least 6 mm.

Due to the insulating action of the insulating layer 10, heat which is generated by the heating element 11 is prevented from dissipating into the floor 2. To this end, the insulation index of the insulating layer 10 is higher than that of the force distribution layer 13.

The insulating layer 10 can be connected to the floor 2 by means of an adhesive layer (not shown). Use of such an adhesive layer is optional. The adhesive layer used may be double-sided tape or gauze, which may be fitted while the roll-up floor heating is being produced, a permanent adhesive layer with protective film or a non-permanent adhesive layer. The advantage of a non-permanent adhesive layer is that this makes it possible to remove the roll-up floor heating after some time.

The aluminium foil 18 ensures that the heat which is generated by the heating element 11 is diffused between the insulating layer 10 and the force distribution layer 13. In addition, the aluminium foil 18 causes any radiant heat which comes from above to be reflected upwards so that it does not penetrate further downwards, or at least does so to a lesser extent. That is the reason why the heating element 11 is situated on the foil 18. In addition, the aluminium foil 18 acts as a moisture barrier.

The force distribution layer 13, the insulating layer 10 and the aluminium foil 18 are of such a thickness and elasticity that the entire roll-up floor heating 1 is sufficiently flexible to enable it to be rolled up. In particular, the entire roll-up floor heating 1 can be rolled up by hand to form a roll with an inner diameter of at most 15 cm. Preferably, this diameter is substantially 10 cm. A roll, comprising the roll-up heating for a floor or wall according to the present invention, can be transported, stored, and sold more conveniently than a flat heating with the same area.

In the exemplary embodiment of FIG. 2, the wooden floor 15 is glued to the roll-up floor heating 1 by means of the adhesive layer 16. Such a way of gluing a floor covering to the roll-up floor heating 1 can also be used in combination with floor tiles, linoleum or carpet. In addition, it is also possible to use loose-laid floor covering, such as laminate or plastic sheet flooring, or to attach the roll-up floor heating to a wall for use as a wall heating. In this case, it is advantageous that the insulating layer prevents the heat from dissipating to an adjacent room, while the force distribution layer protects the heating against horizontal loads on the relevant wall. When using floor tiles, it is important that the roll-up floor heating 1 is compressible only to such a degree that the floor tiles and the joints between the floor tiles do not move significantly with respect to one another in use.

One preferred embodiment of the heating element 11 is formed by an electrical resistance cable 30, as shown in section in FIG. 4. The diameter of the electrical resistance cable 30 is 1 to 2 mm. FIG. 5 shows an alternative electrical resistance cable 31.

The electrical resistance cable 30 comprises a single conductive inner core 40 (FIG. 4) made from one or more copper wires. The conductive core 40 is surrounded by an insulating layer 41, for example made from a plastic such as polyethylene. The insulation 41 is surrounded by an electrically conductive sheath, comprising a foil, in this case an aluminium foil 42. This foil 42 is folded around the insulation 41 in the form of a strip. Alternatively, it may be wound helically around the insulation 41. The aluminium foil 42 acts as an earthing means for the electrical resistance cable 30 and also acts as a screen against electromagnetic radiation. In addition to the aluminium foil 42, four tinned copper wires 43 are provided which extend in the longitudinal direction of the resistance cable 30. The wires 43 make electrical contact with the aluminium foil 42. One advantage of the wires 43 is the fact that they offer a simple connection to external earthing means.

The exterior of the resistance cable 30 is formed by a covering sleeve 44. This covering sleeve may be made of a plastic, such as PCV (Poly Vinyl Chloride).

An electrically conductive sheath, or earthing sheath 42, like that described above can also advantageously be used in an electrical resistance cable which is used for types of heating systems which differ from the roll-up floor heating described above with reference to FIGS. 1, 2 and 3.

FIG. 5 shows an alternative electrical resistance cable 31 with a double conductive core 50, 51. The other elements of the electrical resistance cable 31 are similar to the single resistance cable from FIG. 4 and are therefore denoted by the same reference numerals. Compared to a single-core electrical resistance cable, the electrical resistance cable 31 is able to produce more heat per unit length.

The electrically conductive sheath 42 may also be used as a signal carrier, for applications where the roll-up heating 1 is provided with a separate electrical protection device. If the resistance cable 30, 31 is damaged, an electric voltage will occur in the conductive sheath 42. In a traditional system, the earthing sheath will conduct this electricity to earth. In contrast, the separate electrical protection device will detect the electricity in the signal carrier, and switch of the electricity supply to the roll-up heating 1.

The electrical resistance cable 30 is laid in a meandering path between the insulating layer 10 and the force distribution layer 13. The distance between the successive loops of the meandering path is preferably substantially 4 cm. Due to this intermediate distance, in combination with the aluminium heat diffusion layer 18, a substantially homogeneous heat distribution is achieved. A larger intermediate distance, for example of substantially 6 cm, is likewise possible. If this is combined with a greater thermal conductivity of the heat diffusion layer 18, for example by using a thicker aluminium foil, a uniform heat distribution can be maintained.

A uniform heat distribution is also achieved by the thickness and heat-conveying properties of the force distribution layer 13. In this case, a certain degree of thermal insulation of the force distribution layer is advantageous, but this has to be less than that of the insulating layer 10.

The advantage of a resistance cable 30 over, for example a heat-generating foil, is that the former is less vulnerable. If the roll-up floor heating is locally severely dented or even perforated, this will be more likely to cause damage with a foil than with a resistance cable.

The invention also relates to an electrical connector, or socket 60 (FIGS. 6-12). The socket 60 is intended to be incorporated in a floor heating, in particular the roll-up floor heating 1, for joining floor heating systems together and for coupling a floor heating to a mains supply. To this end, the socket 60 is provided near the edge of a floor heating, preferably near a corner.

The socket 60 comprises a plastic housing 61, a lid 62 and a plurality of electrically conductive connecting pieces, in particular connecting strips 65-67. These connecting strips 65-67 are substantially T-shaped, the strip 67 comprising an additional cross piece at its base. The first connecting strip 65 is the zero-strip, intended for electrically connecting the zero of an alternating current voltage. The second connecting strip 66 is intended for connecting the phase. The third connecting strip 67 is intended for electrically connecting earth, or the signal of an electrical protection device as described above. Incidentally, zero and phase may also be reversed and the socket is also suitable for direct current voltage, in which case the connecting strips 65 and 66 are intended for the negative and the positive poles, respectively.

Near their ends, the connecting strips are provided with a cable clip 68. Furthermore, the earthing strip 67 is provided with two sheath clips 69.

The housing 61 is furthermore provided with a first, second and third recess 71, 72 and 73, in this case a first, second and third accommodating groove. The accommodating grooves 71-73 are intended for accommodating rubber sealing strips 74, 75 and 76.

The first and second rubber sealing strips 74, 75 are of identical dimensions and can be accommodated both in the first and in the second accommodating groove 71, 72. The first sealing strip is provided with at least one, in this case three, round openings for sealingly accommodating a sheath of a round power cable. The second sealing strip is provided with substantially flat openings for sealingly leading through an electrical coupling piece which will be described in more detail below. The third sealing strip 76 is provided with two substantially round openings for leading through two ends of electrical resistance cables, in particular the two ends of the resistance cable 30. The rubber sealing strips 74, 75 and 76 thus ensure a water- and vapour-tight lead-through for electrical connections.

Furthermore, the socket 60 comprises a first and a second insulating strip 80, 81 made of an electrically insulating material, for example plastic.

The socket 60 can be coupled to a second socket, for electrically coupling at least two electrical floor heating systems. The housing 61 is provided with complementary first and second coupling means 85, 86. The first coupling means 85 comprise at least one, preferably two, projections, preferably provided with a barb. The second coupling means 86 are formed by a recess in the housing 61 and are designed to interlock with the at least one barbed projection. The complementary coupling means 85 and 86 are intended for coupling to a socket 60 which is inside an adjoining roll-up floor heating 1. In addition to the coupling means 85, 86 shown on one side of the recesses 71, 72, it may be advantageous to include coupling means on both sides of the recesses 71, 72. In this manner, these recesses are pressed together in a more balanced manner when two sockets 60 are coupled together.

In order to couple the two sockets 60, the invention provides for an electrical coupling piece 90, in this case a multiple electrical coupling piece, in particular a three-way electrical coupling piece. The three-way electrical coupling piece 90 comprises three current feed-through elements 91, in this case formed by metal strips having chamfered corners. The current feed-through elements are mechanically connected to one another by an insulating connecting bridge 92. The connecting bridge 92 is made from a sealing material, such as rubber or a flexible plastic, and also serves as a seal for sealing the socket 60, together with the second sealing strip 75, in a watertight and vapour-tight manner.

The socket 60 is furthermore provided with coupling and positioning pins 87. In this case, the pins 87 are provided on the housing, whereas the lid 62 is provided with complementary spaces 88 in the shape of through-openings. The lid 62 is furthermore provided with pressure elements 89 at the location of the spaces 88. Both the connecting strips 65-67 and the cable clips 68 are provided with openings which are complementary to the pins 87.

As can best be seen in FIG. 12, the socket 60 is assembled by sliding the first connecting strip 65 with its openings over the corresponding pins 87. An insulating strip 80 is placed on top and subsequently the second strip 66 is slid over the corresponding pins 87, followed by insulating strip 81. Then, the third connecting strip 67 follows which is also pushed onto the pins 87. Finally, several, in this case eight, cable clips 68 are provided on the pins 87, following which sealing strips 74 and/or 75 are provided in the accommodating grooves 71 and/or 72, and a sealing strip 76 in accommodating groove 73. By using a sealing strip with round openings 74, the relevant side of the socket 60 is made suitable for the use of single lead-through cables (not shown). These lead-through cables (not shown) may run through a heating mat and connect the socket 60 to a second socket, preferably an identical second socket 60. Using a sealing strip with flat openings 75 makes it possible to couple the relevant side of the socket 60 directly to a socket in an adjoining floor heating mat using the three-way electrical coupling piece 90.

Finally, the lid 62 is fitted, during which procedure the pins 87 drop into the openings 88, thereby pressing the pressure elements 89 onto the cable clips 68, resulting in these contacting the corresponding connecting strips 65-67 in an electrically conductive manner. The lid 62 is sealingly connected to the raised edge and the pins 87 of the housing 61 by means of heat-sealing and/or gluing.

Both the beginning and the end of a heating cable, preferably the electrical resistance cable 30, are pushed through the openings in the sealing strip 76. In this case, the earthing sheath 42 conductively contacts the sheath clip 69. One or more core wires 40 protrude from the insulating layer 41 of the electrical resistance cable 30 and are accommodated in a clamping manner by a corresponding cable clip 68.

The housing 61 is so flat, this it can be accommodated in roll-up floor heating 1. In particular, it can be accommodated in the insulating layer 10, for example by locally creating a recess in the insulating layer 10.

Figure 13:
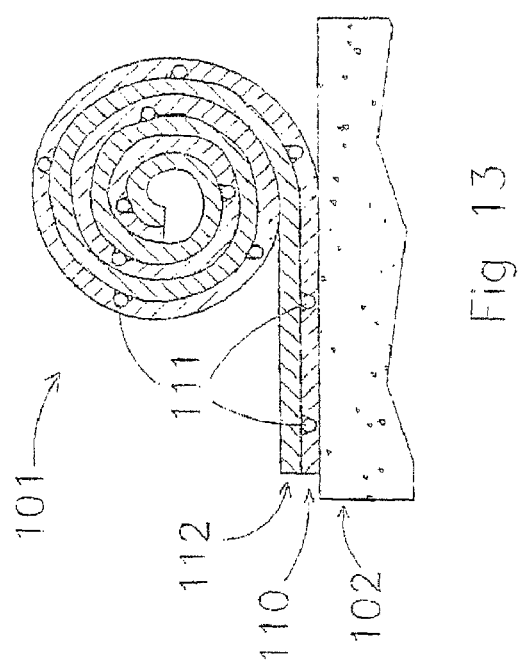
FIG. 13 shows a further embodiment of a roll-up floor heating according to the invention in a partially rolled up and partially unrolled state.

FIG. 13 diagrammatically shows another embodiment of a roll-up floor heating 101 according to the invention. The roll-up floor heating 101 is still partially rolled up in FIG. 13 and partially unrolled onto a floor, in this case a concrete floor 102. The roll-up floor heating 101 comprises an insulating layer 110, an elongated heating element 111 and a cladding 112. In this embodiment, the elongated heating element 111 is an electrical resistance cable, and may be similar to cable 30, or 31, as described above.

In this exemplary embodiment, the cladding 112 is a single, or homogeneous layer and comprises part of a force distribution layer 113. The insulating layer 110 comprises a second part of the force distribution layer 113. One could also consider the force distribution layer comprising two sublayers; the first sublayer being the cladding 112 and the second sublayer being the insulating layer 110. In this embodiment, the cladding 112 has a higher modulus of elasticity and a higher density than the insulating layer 110. The insulating layer 110 exhibits a greater compressibility than the cladding 112. This difference in elasticity modulus results in a force distribution effect which is comparable to the effect of the two sublayers 20, and 21 of the force distribution layer 13 as described in relation to the first embodiment.

A floor covering is provided on the cladding 112, in this case consisting of a wooden or parquet floor 115 (FIG. 14). The wooden floor 115 is fixedly connected to the cladding 112 by means of an adhesive layer 116. A finishing layer 117 is provided on the wooden floor 115, for example a lacquer coating. An aluminium foil 118 extends between the insulating layer 110 and the cladding 112.

The insulating layer 110 comprises a groove 125 at the side of the insulating layer 110 which is facing the cladding 112. This groove 125 accommodates the electrical resistance cable 111.

There is no rigid intermediate layer, above the cladding 112. The wooden floor 115 is supported directly by the cladding 112, while the force distribution layer 113 protects the heating element 111 against loads on the wooden floor 15 and transfers such loads via the insulating layer 110 to the concrete floor 102.

The toll-up floor heating 101 may be produced as following. A plastic foam is produced in a manner known in the art, e.g. by mixing at least two components. After the basic chemical reaction between the two components has taken place, but before the material has set, the plastic foam is still in a plastically deformable state. In this state, the plastic is fed between two parallel running rollers. One of these rollers has a ridge, protruding from its surface. Preferably, the ridge is continuous and meandering. When the plastically deformable plastic foam is fed through the space between the rollers, a sheet 110 is being formed. Thanks to the ridge, a preformed groove 125, adjusted for accommodating the elongated heating element 111, is formed in one side of the sheet of plastic foam 110.

Further, a cladding 112, e.g. a sheet of non woven fibres, is being produced and supplied in a manner known per se. A flexible elongated heating element 111, such as an electrical resistance cable 30, is being supplied as well. A heat-diffusing layer, such as an aluminium foil 118, may be supplied on the plastic foam 110.

The elongated heating element 111 is put into the groove 125 of the plastic foam 110. An adhesive material such as glue is provided on the plastic foam 110 and the cladding 112 is joined to the plastic foam 110. However, other types of joining may be applied as well.

Two portions of material of the roll-up floor heating 101 are taken out, e.g. by punching. These portions have the size of a connector. The resulting openings, or recesses, are preferably provided along two opposite sides of the roll-up floor heating 101, opposite of each other. A first electrical connector, e.g. a socket 60 as described above, is inserted in one of the openings and connected to the two ends of the electrical resistance cable 111. A second connector is inserted in the other opening and electrically connected to the first connector.

As a final step, the now assembled roll-up floor heating 101 is rolled up and packaged for transport and storage.

FIGS. 15 and 16 show a different, and preferred, embodiment of electrical connectors, which may be used for a roll-up heating, but are also suitable for other applications. A male electrical connector 160 (FIG. 15) comprises a plastic housing 161, a linking band 162 and a plug 163. In this example, the housing 161, linking band 162, and plug 163 are moulded, preferably injection moulded, in one piece PVC, enclosing the electrical components described below in a water-tight manner. However, these parts may be fabricated separately and joined later, and may also consist of other materials.

The housing 161 accommodates a plurality of electrically conductive connecting components, in particular connecting metal strips 165-167. These connecting strips 165-167 are substantially L-shaped, the strip 167 comprising an additional cross piece 168 at a first end. The first connecting strip 165 is the zero-strip, intended for electrically connecting the zero of an alternating current voltage. The second connecting strip 166 is intended for connecting the phase. The third connecting strip 167 is intended for electrically connecting earth, or carrying a signal. Incidentally, zero and phase may also be reversed and the socket is also suitable for direct current voltage, in which case the connecting strips 165 and 166 are intended for the negative and the positive poles, respectively.

A flat metal pin 175-177 extends at a second end of each of the strips 165-167, out of the plug 163. Around the plug 163 extends two sealing O-rings 180, in this case made of rubber. The housing 161 is provided with a soldering opening, exposing the two first ends of strips 165 and 166, as well as the cross piece 168 of strip 167. The housing 161 is further provided with two closing openings 181.

Three electrically connecting cables 185-187 extend through the linking band 162, into the housing 161, where they are electrically connected to the strips 165-167.

FIG. 16 shows a female connector 260, comprising a plastic housing 261, a linking band 262 and a contra plug, or receiving hole 263. The three electrically connecting cables 185-187 extend through the connecting strip 266, into the housing 261, where they are electrically connected to fastons 275-277, e.g. by shrinkage. The housing 261 is further provided with two closing openings 281.

In this example, the housing 261, with contra plug 263 and linking band 262, are moulded, preferably injection moulded, in one piece glass reinforced PBT (Polybutylene terephthalate). An advantage of this material is that it is dimensionally stable. The housing 261 encloses the fastons 275-277, and part of the connecting cables 185-187, in a water-tight manner.

In a variant, these plastic parts may be fabricated separately and joined later, and may also consist of other materials, such as other plastics, with or without fibre reinforcement.

FIG. 17 schematically shows two roll-up floor heatings 1, each with a male 160, and a corresponding female 260 connector, as well as a female mains supply connector 360, with mains cable 385. The roll-up floor heating 1 is here schematically indicated with dotted lines, and with electrical resistance cable 30. In reality, the electrical resistance cable 30 will form more meandering loops than shown, and will cover more area of the roll-up floor heating 1.

The female mains supply connector 360 resembles the female connector 260. However, there is no need for a linking band, and the mains cable 385 is inserted through one opening, instead of three.

The two ends of the electrical resistance cable 30 have been inserted in the soldering opening, where inner core 40 has been electrically connected to the two first ends of connecting strips 165 and 166, and the earthing sheet 42 has been electrically connected to the ends of cross piece 168 of connecting strip 167. After inserting and connecting the resistance cable 30, the soldering opening has been closed, in this example by means of a hot melt, e.g. of polyamide. As the hot melt provides a good connection with the plastic housing 161, the female connector 160 with inserted resistance cable 30 is water-tight.

The male 160, and corresponding female 260 connector are accommodated in mating recesses of the roll-up floor heating 1. In particular, the size of the recesses correspond to the size of the housing 161, 261. The linking bands 162, 262 are received inside the roll-up floor heating 1, in particular between the insulating layer 10, and the cladding 12.

FIG. 17 further shows how two strips roll-up floor heating 1 can be interconnected via a male 160 and female 260 connector of two neighbouring roll-up floor heatings 1. In this manner, even more than two roll-up floor heatings 1 can be interconnected. Only one of the roll-up floor heatings 1 needs to be connected to mains, via mains cable 385 with female mains supply connector 360.

The male 160 and female 260 electrical connectors may be joined together, using closing brackets (not shown). These closing brackets may be substantially L-shaped, and each comprise two protruding engagement parts, for co-operating with the closing openings 181, and 281. The closing brackets are mounted on the electrical connectors 160 and 260, with one side of the L-shape lying on the respective connector and on side extending substantially upwards. These upward extending parts can then be grabbed with a tool, e.g. a pair of pincers, for pulling the closing brackets, and thus the connectors, towards each other. When the male connector 160 is inserted fully into the female connector 260, the closing brackets may be removed, and used for connecting a next roll-up heating.

The above described male 160, and female 260 connectors are flexible, such that they can be rolled up together with the roll-up heating that they are accommodated in. This flexibility is achieved by using flexible plastics, as well as relatively thin electrically conducting components. The ability to be rolled-up is further enhanced by the linking bands 162, 262, which provides a transitional stage from the roll-up heating 1 to the connectors 160, 260.

As the connectors 160, 260 are solid, and made of durable materials, they can be subject to similar vertical loads as the roll-up floor heating 1.

Connecting cables (not shown) may be provided, with a male connector and a female connector at each end. The female connector may be same as the female mains supply connector 360. The male connector for the connecting cable may resemble the male connector 160, without a soldering opening, without a linking band, and with just one opening for the connecting cable. Such connecting cables may be use for interconnecting two roll-up floor heatings 1, that cannot be joined directly next to each other such, that the respective male and female connectors 160, 260 can be inserted directly into each other.

In an embodiment, the roll-up heating for a floor, or wall, comprises a second resistance wire, which is electrically insulated with respect to the first resistance wire.

Preferably, the insulating layer comprises a sound-absorbing material which results in a noise reduction of at least 10 dB.

Preferably, the compressibility of the roll-up heating for a floor, or wall, is so low that floor tiles can be used on top of it.

Preferably, the force distribution layer is elastic to absorb the shrinkage and expansion of a wooden floor covering glued onto the cladding.

In addition to the preferred embodiment shown and described, many variants are possible within the scope of the invention. Thus, the insulating layer may be made from a variety of different materials, such as foamed polymers and other plastics, cork, pressed or glued fibres, and grades of paper, such as cardboard. Advantageously, the insulating layer may also be provided with air chambers in order to increase the insulation index in a lightweight manner. What is relevant is that the insulation index is higher than that of the cover, with the proviso that it is possible to use a lower insulation index if the floor itself is already sufficiently insulated. In general, a thermal conduction coefficient of substantially 0.2 W/(m·K) suffices. In addition, it is important that the material of the insulating layer is sufficiently flexible to keep the roll-out heating for a floor, or wall, capable of being rolled up. When using finishes such as carpet, laminate, parquet, tiles, linoleum and the like, it is important that no forces, such as expansion and shrinkage, start to work in the insulating layer.

The heat diffusion layer can be omitted, especially if the distance between the loops of the resistance cable is small, or a heat-producing foil is used instead of a resistance cable. Even in those cases, a heat-diffusing foil may be advantageous, for example in order to reflect the heat which has developed upwards and to act as a moisture barrier. Materials which possess good thermal conduction properties are suitable as an alternative to the aluminium foil. It is also possible to create a heat diffusion layer by compressing the top of the insulating layer, for example by heating or pressing, or by providing a separate closing layer on top of the insulating layer. In these cases, therefore, the heat-diffusing layer forms part of the insulating layer.

The electrical resistance cable may be laid along alternative paths, for example paths with a greater or smaller intermediate distance than 4 cm. The advantage of using a smaller distance than 4 cm is that it may be possible to omit the use of an aluminium heat-diffusing layer. By contrast, a greater intermediate distance is less expensive, but offers a less uniform generation of heat.

It is possible to use heat foils, for example based on carbon or a (metal) alloy, instead of a resistance cable in an embodiment such as the one of FIGS. 1 and 2.

When using a resistance cable, an alternative electrically conductive foil may be used as conductive sheath, such as an electrically conductive plastic, or another metal foil. A conventional resistance cable with a braided earthing screen can also be used.

The insulation for the core of the resistance cable and the covering sleeve of the resistance cable may be made of polyethylene, teflon FEP (Fluorinated Ethylene Propylene), HDPE (High Density Polyethylene), LDPE (Low Density Polyethylene), PVC (Polyvinyl Chloride) or PET (Polyethylene). The core of the resistance cable may be made from chromium nickel and various other resistance alloys instead of from copper.

Various alternatives are possible with respect to the force distribution layer. Thus, the first and second sublayer may differ from one another not only regarding density, but also regarding composition. The sublayers may also gradually merge in such a manner that no clear boundaries are visible. Alternative materials for the force distribution layer are rubber, both in vulcanized and granulated form, various plastics, such as polymer or polyurethane, grades of pressed paper and biologically degradable types.

In an embodiment with a groove for an elongated heating element, there is less need for a force distribution layer with two sublayers having different properties. The groove might also be present in the cladding, instead of the insulation layer. There may be a groove in both the cladding, and the insulation layer. Preferably the positions of these grooves substantially correspond, for accommodating an elongated heating element in co-operation.

The insulating layer and the cladding can be but do not have to be connected by means of a connecting means, such as adhesive. If an adhesive is used, a polymer adhesive or hot-melt adhesive may be used. Alternatively, instead of adhesives, thermal welding may be used. It is also possible to construct the insulating layer and the force distribution layer as a single piece, for example in the form of a plastic foam, the density of which varies and in which recesses are provided for accommodating a heating element.

Alternative materials to plastic, such as metal, may be used for the electrical connector. The current feed-through elements do not have to be rectangular in section, but may, for example, also be round.

Thus, the invention provides a roll-up heating for a floor, or wall, which can be rolled up due to the flexibility of the materials used, including the incorporated electrical connector. This makes it easy to produce, transport and subsequently lay the heating for a floor, or wall. Due to the force distribution layer and/or the groove various types of covering floors can be used, it being possible to use an electrical resistance cable between the cladding and the insulating layer with a low risk of damage to the resistance cable. The electrical resistance cable according to the invention can be produced in a simple and inexpensive manner by using aluminium foil as conductive sheath.

What is claimed is:

1. Combination of a roll-up heating (1) for a floor or wall and at least one electrical connector (160, 260) adapted for being accommodated in the roll-up heating (1), the at least one electrical connector (160, 260) being flat, thin and flexible and comprising thin electrically conductive components (165-168, 275-277) such that it is suitable for being rolled up with the roll-up heating (1).

2. Combination according to claim 1, wherein the at least one electrical connector comprises a housing (161, 261) which is enveloping the electrically conductive components (165-168, 275-277).

3. Combination according to claim 2, wherein the housing (161, 261) is injection moulded.

4. Combination according to claim 2, wherein the housing encloses the electrically conductive components (165-168, 275-277) in a water-tight manner.

5. Combination according to claim 2, wherein the housing is flat such that it is accommodated in the roll-up heating (1) by locally creating a recess in an insulating layer of the roll-up heating (1).

6. Combination according to claim 1, wherein the at least one electrical connector (160, 260) comprises linking bands (162, 262) for providing a transitional stage from the roll-up heating (1) to the at least one electrical connector (160, 260).

7. Combination according to claim 1, wherein the at least one electrical connector (160, 260) is provided near an edge of the roll-up heating (1) for joining the roll-up heating (1) together and for coupling the roll-up heating (1) to a mains supply.

8. Combination according to claim 1, wherein the thin electrically conductive components (165-168, 275-277) are arranged such that planes spanned by the length and width of the thin electrically conductive components (165-168, 275-277) are parallel.

9. Combination according to claim 1, wherein the thin electrically conductive components (165-168, 275-277) are all arranged in a single plane.

10. Combination according to claim 1, wherein the at least one electrical connector (160, 260) comprises flexible materials.

11. Combination according to claim 1, wherein the thin electrically conductive elements (165-168, 275-277) are flat.

12. Combination according to claim 1, wherein the at least one electrical connector (160, 260) provides interconnection with at least one electrical connector of a to be joined second combination.

13. Combination according to claim 8, wherein the thin electrically conductive components (165-168, 275-277) are all arranged in a single plane.

14. Combination according to claim 1, wherein said heating comprises an insulating layer, a heating element and a cladding, in which the insulating layer is adapted for laying on a floor and the heating element extends between the cladding and the insulating layer.

* * * * *